(12) United States Patent
Liu et al.

(10) Patent No.: US 10,763,539 B2
(45) Date of Patent: Sep. 1, 2020

(54) INORGANIC SOLID ELECTROLYTE COMPOSITE SLURRY, METHOD FOR PREPARING, APPLICATION AND LITHIUM-ION BATTERY HAVING THE SAME

(71) Applicant: Microvast Power Systems Co., Ltd., Huzhou, Zhejiang Province (CN)

(72) Inventors: Zhangbo Liu, Huzhou (CN); Xingzhi Mei, Huzhou (CN); Jinjie Chen, Huzhou (CN); Yi Fang, Huzhou (CN); Zhuoqun Zheng, Huzhou (CN); Yuehui Yin, Huzhou (CN); Wenjuan Liu Mattis, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 18 days.

(21) Appl. No.: 16/041,694

(22) Filed: Jul. 20, 2018

(65) Prior Publication Data
US 2019/0027780 A1   Jan. 24, 2019

(30) Foreign Application Priority Data
Jul. 24, 2017   (CN) .......................... 2017 1 0606531

(51) Int. Cl.
*H01M 10/0525*   (2010.01)
*H01M 10/058*   (2010.01)
(Continued)

(52) U.S. Cl.
CPC ......... *H01M 10/0525* (2013.01); *H01M 4/13* (2013.01); *H01M 4/366* (2013.01);
(Continued)

(58) Field of Classification Search
None
See application file for complete search history.

(56) References Cited

U.S. PATENT DOCUMENTS

| 2012/0276439 A1 | 11/2012 | Fujita et al. | |
| 2013/0017435 A1* | 1/2013 | Sato ...................... | H01M 4/505 429/158 |

(Continued)

FOREIGN PATENT DOCUMENTS

| EP | 2683005 A1 | 1/2014 |
| WO | 2017/045944 A1 | 3/2017 |

*Primary Examiner* — Daniel S Gatewood
(74) *Attorney, Agent, or Firm* — Cheng-Ju Chiang (57) ABSTRACT

A method for preparing an inorganic solid electrolyte composite slurry includes: mixing an inorganic solid electrolyte powder with a first solvent and wet grinding an obtained mixture to form a preparatory slurry A; mixing a binder with a second solvent to form a preparatory slurry B; mixing the preparatory slurry A with the preparatory slurry B to obtain the inorganic solid electrolyte composite slurry. The inorganic solid electrolyte composite slurry prepared by the present disclosure effectively solves the problem that it is difficult to reduce the inorganic solid electrolyte powder particle size in the preparation process, or it is difficult to fully dry the inorganic solid electrolyte powder after sand milling. The present disclosure further provides an inorganic solid electrolyte composite slurry prepared by the method, an application of the inorganic solid electrolyte composite slurry, and a lithium-ion battery having the inorganic solid electrolyte composite slurry.

20 Claims, 3 Drawing Sheets (51) Int. Cl.
*H01M 4/36* (2006.01)
*H01M 4/13* (2010.01)
*H01M 2/16* (2006.01)

(52) U.S. Cl.
CPC ........ *H01M 10/058* (2013.01); *H01M 2/1673* (2013.01); *H01M 2300/0037* (2013.01); *H01M 2300/0082* (2013.01)

(56) References Cited

U.S. PATENT DOCUMENTS

| | | | |
|---|---|---|---|
| 2015/0099188 A1* | 4/2015 | Holme | H01M 10/0525 429/231.95 |
| 2016/0365604 A1 | 12/2016 | Mimura et al. | |
| 2017/0125842 A1* | 5/2017 | Meguro | H01M 4/62 |
| 2017/0133713 A1 | 5/2017 | Makino et al. | |

* cited by examiner

INORGANIC SOLID ELECTROLYTE COMPOSITE SLURRY, METHOD FOR PREPARING, APPLICATION AND LITHIUM-ION BATTERY HAVING THE SAME

CROSS REFERENCE TO RELATED APPLICATION

The present application is based on and claims priority of Chinese Patent Application No. 201710606531.9, filed on Jul. 24, 2017. The entire disclosure of the above to identified application, including the specification and claims are incorporated herein by reference in its entirety.

FIELD OF THE INVENTION

The present disclosure relates to an inorganic solid electrolyte composite slurry, a method for preparing the inorganic solid electrolyte composite slurry, an application of the inorganic solid electrolyte composite slurry and a lithium-ion battery having the inorganic solid electrolyte composite slurry.

BACKGROUND OF THE INVENTION

As a commercial storage battery, lithium-ion battery has the advantages of high energy density, long cycle life, no memory effect, and environmental friendliness, and has been widely used in portable digital devices, new energy vehicles, and energy storage devices. However, as the increase of the energy density requirement of lithium-ion batteries in the terminal market, the battery safety issue has become increasingly prominent, and has become a major bottleneck restricting the further development and innovation of lithium-ion battery technology. During use of the lithium-ion batteries, if the battery is abused (such as overcharged, overheated, or etc.) or subjected to violent impact, bending, piercing or other unexpected accidents, it is prone to cause fire or even explosion due to thermal runaway inside the battery. For the battery itself, the main cause of the thermal runaway is the poor thermal stability of the positive/negative active material, the separator diaphragm and the electrolyte. Meanwhile, some deficiencies in overall structural design of the battery are also the reason for the thermal runaway of the battery.

For this reason, in addition to actively developing new types of electrodes, separators, and electrolyte materials with excellent thermal stability, R&Ds have also devoted much energy to optimize the existing battery material system in order to improve the safety of the lithium-ion batteries without damaging or even improving the battery performance of the original system. Coating or depositing a thin layer of inorganic solid electrolyte composite coating with excellent lithium-ion conductivity and thermal stability on the positive/negative electrode plate or separator surface of the lithium-ion battery is an effective solution which could improve the cycle life and the safety features of the battery.

The coating or deposition of the inorganic solid electrolyte composite coating on the positive/negative electrode plate or separator surface of the lithium-ion battery is mainly achieved by two ways. The first one is physical vapor deposition methods such as magnetron sputtering, electron beam evaporation, pulsed laser deposition, ion beam sputtering or atomic layer deposition, and the second one is wet coating processes such as extrusion coating, gravure coating, screen printing, spray coating, or inkjet printing. Compared to various physical vapor deposition methods, preparing the inorganic solid electrolyte composite coatings by wet coating process undoubtedly has higher efficiency and lower cost, and is easy to seamlessly dock with the existing electrode plate preparation and separator coating process of the lithium-ion batteries, and therefore has more industrial application prospects.

For the wet coating process, the preparation of the inorganic solid electrolyte composite slurry is extremely important. The preparation method of the conventional inorganic solid electrolyte composite slurry is similar to the preparation method of the coating slurry of the lithium-ion battery electrode plate. The method includes firstly dissolving the required binder into the solvent, adding the inorganic solid electrolyte powder, the conductive agents and other components after the binder completely dissolved, and fully and evenly mixing the components together.

Considering that the requirement on energy density of lithium-ion batteries is increasingly increased in the terminal market, the thickness of the inorganic solid electrolyte composite coating applied to the positive/negative electrode plates or the separator surface of the lithium-ion battery should not be too thick (generally not more than 5 μm). However, after being prepared by the high temperature solid phase reactions, the particle size of many solid inorganic electrolytes such as garnet-type $Li_7La_3Zr_2O_{12}$ (LLZO), NASICON-type $Li_{1+b}Al_bGe_{2-b}(PO_4)_3$ (LAGP) or perovskite-type $Li_{3a}La_{2/3-a}TiO_3$ (LLTO) is usually large ($D_{50}$ is generally greater than 5 μm). Therefore, in order to prepare the inorganic solid electrolyte composite slurry by conventional method of firstly dissolving the binder into the solvent and then adding the inorganic solid electrolyte powder and other necessary components, it is necessary to firstly mill the inorganic solid electrolyte powder prepared by the solid-phase reactions with a relatively large particle size to an ultrafine powder having a sufficiently small particle size ($D_{90}$ not more than 500 nm) by wet grinding (such as wet ball milling and/or sand milling). However, after the wet grinding process is completed, the drying of the inorganic solid electrolyte ultrafine powder, that is, the removal of the grinding solvent, is difficult to achieve. If the drying of the inorganic solid electrolyte ultrafine powder is accomplished by centrifugal separation, suction filtration, distillation or spray drying method, although the process is relatively simple, it is easy to cause the re-growth of the ultrafine powder. If the technique such as freeze-drying is used to effectively suppress the re-growth of the ultrafine powder, the cost and the energy consumption are both high, and the time spent is also long and therefore is not suitable for industrial production. On the other hand, if the composite slurry containing the dissolved binder and the large particle size of the inorganic solid electrolyte powder is directly subjected to the wet grinding process, the grinding efficiency will be low due to the presence of the binder, especially for the sand milling process, it is very easy to clog the grinding tank gap of the sand mill machine.

SUMMARY OF THE INVENTION

The present disclosure provides a method for preparing an inorganic solid electrolyte composite slurry. The method includes the following steps: mixing an inorganic solid electrolyte powder with a first solvent and wet grinding an obtained mixture to form a preparatory slurry A; mixing a binder with a second solvent to form a preparatory slurry B;

mixing the preparatory slurry A with the preparatory slurry B to obtain the inorganic solid electrolyte composite slurry.

The inorganic solid electrolyte powder of the present disclosure is prepared by a solid phase reaction method. In an embodiment, the solid phase reaction method is a method including fully mixing the reactants and calcining the obtained mixture at a high temperature for a long time to obtain the inorganic solid electrolyte powder. In one embodiment, the high temperature is in a range from 700° C. to 1300° C. In an embodiment, the calcining time is about 2 to 48 hours. However, due to the mixture needs to be calcined at a high temperature for a long time in the preparation process, the obtained inorganic solid electrolyte powder has a large particle size, and the powder needs to be ground to smaller-sized particles in actual use. The method for preparing the inorganic solid electrolyte composite slurry of the present disclosure effectively solves the problem that it is difficult to sufficiently reduce the particle size of the inorganic solid electrolyte powder in the existing preparation process or it is difficult to fully dry the sand-milled inorganic solid electrolyte powder, and is easy to realize industrial application.

In the preparatory slurry A prepared by the step of mixing an inorganic solid electrolyte powder with a first solvent and wet grinding an obtained mixture to form a preparatory slurry A, the no binder contained inorganic solid electrolyte powder could be sufficiently refined by the wet grinding method. The preparatory slurry B prepared by the step of mixing a binder with a second solvent to form a preparatory slurry B contains no inorganic solid electrolyte powder, which ensures the binder be sufficiently dissolved in the solvent.

Meanwhile, the method for preparing the inorganic solid electrolyte composite slurry of the present disclosure does not include the step of separating the solvent from the inorganic solid electrolyte powder. This prevents the inorganic solid electrolyte particles from becoming larger again in the solvent separating process, and ensures the thickness of the prepared inorganic solid electrolyte composite slurry coating is not large. In the present disclosure, the inorganic solid electrolyte powder is dissolved in a solvent alone (that is, does not dissolving binder in the preparatory slurry A) and wet ground to improve the grinding efficiency of the inorganic solid electrolyte powder.

In an embodiment, the step of mixing the preparatory slurry A with the preparatory slurry B to obtain the inorganic solid electrolyte composite slurry includes: mixing the preparatory slurry A and the preparatory slurry B with a third solvent to obtain an inorganic solid electrolyte composite slurry. In an embodiment, the solvents in the preparatory slurry A, the preparatory slurry B and the inorganic solid electrolyte composite slurry (i.e., the first solvent, the second solvent and the third solvent) are the same kind of solvent, which further ensures sufficient mixing of the two preparatory slurries.

In an embodiment, the step of mixing the preparatory slurry A with the preparatory slurry B to obtain the inorganic solid electrolyte composite slurry includes: mixing the preparatory slurry A and the preparatory slurry B with a conductive agent to obtain an inorganic solid electrolyte composite slurry.

In an embodiment, the step of mixing the preparatory slurry A with the preparatory slurry B to obtain the inorganic solid electrolyte composite slurry includes: mixing the preparatory slurry A and the preparatory slurry B with a third solvent and a conductive agent to obtain an inorganic solid electrolyte composite slurry.

In an embodiment, in the step of mixing an inorganic solid electrolyte powder with a first solvent and wet grinding an obtained mixture to form a preparatory slurry A, the wet grinding is selected from wet ball milling and/or sand milling. In the present disclosure, the operation of the wet ball milling is simple, the cost is low, and the grinding efficiency is lower than the sand milling. In an embodiment, if the particle size D50 of the inorganic solid electrolyte powder obtained by the solid phase reaction method is greater than 20 µm, the inorganic solid electrolyte powder may be first subjected to wet ball milling and then subjected to sand milling to obtain an inorganic solid electrolyte powder having a particle size D50 of smaller than 200 nm.

In an embodiment, the wet grinding medium applied in the step of mixing an inorganic solid electrolyte powder with a first solvent and wet grinding an obtained mixture to form a preparatory slurry A is selected from at least one of zirconia beads, zirconium silicate beads, stainless steel beads, alumina beads, agate beads, and hard alloy beads. In another embodiment, the wet grinding medium is selected from at least one of zirconia beads, zirconium silicate beads, and stainless steel beads.

In an embodiment, in the step of mixing an inorganic solid electrolyte powder with a first solvent and wet grinding an obtained mixture to form a preparatory slurry A, the temperature during wet grinding process is in a range from 20° C. to 50° C. In another embodiment, in the step of mixing an inorganic solid electrolyte powder with a first solvent and wet grinding an obtained mixture to form a preparatory slurry A, the temperature during wet grinding process is in a range from 25° C. to 40° C. In the present disclosure, if the grinding temperature is lower than 20° C., the inorganic solid electrolyte and the solvent could not be sufficiently mixed, and the particle size of the powder obtained by grinding is large. This results the inorganic solid electrolyte composite slurry coated on the positive and negative electrodes or the separator has a large thickness which will further affect the performance of the battery. If the grinding temperature is higher than 50° C., the solvent will evaporate rapidly during the grinding process and cause the grinding effect be poor.

In an embodiment, in the step of mixing an inorganic solid electrolyte powder with a first solvent and wet grinding an obtained mixture to form a preparatory slurry A, the wet grinding is sand milling.

In an embodiment, in the step of mixing an inorganic solid electrolyte powder with a first solvent and wet grinding an obtained mixture to form a preparatory slurry A, the sand milling time is in a range from 1 hour to 24 hours. In another embodiment, in the step of mixing an inorganic solid electrolyte powder with a first solvent and wet grinding an obtained mixture to form a preparatory slurry A, the sand milling time is in a range from 2 to 12 hours.

In an embodiment, in the step of mixing an inorganic solid electrolyte powder with a first solvent and wet grinding an obtained mixture to form a preparatory slurry A, a rotation speed in the sand milling process is in a range from 1500 rpm to 3500 rpm. In another embodiment, in the step of mixing an inorganic solid electrolyte powder with a first solvent and wet grinding an obtained mixture to form a preparatory slurry A, a rotation speed in the sand milling process is in a range from 2000 rpm to 3000 rpm. In the present disclosure, if the sand milling time is too short or the rotational speed of the sand milling is too slow, the particle size of the obtained inorganic solid electrolyte powder will be large, and the thickness of the coating layer on the positive and negative electrodes or the separator of the battery will be great, which will reduce the battery performance. If the sand milling time is too long or the rotational speed of the grinding is too fast, a large amount of solvent will evaporate during the grinding process, which will result a waste of the solvent. The cooperation of the preferred sand milling time and sand milling speed of the present disclosure can ensure that the prepared inorganic solid electrolyte powder could better achieve the technical effects of the present disclosure.

In an embodiment, in the step of mixing an inorganic solid electrolyte powder with a first solvent and wet grinding an obtained mixture to form a preparatory slurry A, the wet grinding is wet ball milling.

In an embodiment, in the step of mixing an inorganic solid electrolyte powder with a first solvent and wet grinding an obtained mixture to form a preparatory slurry A, the wet ball milling time is in a range from 6 to 48 hours. In another embodiment, in the step of mixing an inorganic solid electrolyte powder with a first solvent and wet grinding an obtained mixture to form a preparatory slurry A, the wet ball milling time is in a range from 10 to 24 hours.

In an embodiment, in the step of mixing an inorganic solid electrolyte powder with a first solvent and wet grinding an obtained mixture to form a preparatory slurry A, a rotation speed in the wet ball milling process is in a range from 100 rpm to 1000 rpm. In another embodiment, in the step of mixing an inorganic solid electrolyte powder with a first solvent and wet grinding an obtained mixture to form a preparatory slurry A, a rotation speed in the wet ball milling process is in a range from 200 rpm to 600 rpm. The cooperation of the preferred wet ball milling time and wet ball milling speed could better achieve the technical effects of the present disclosure.

In an embodiment, the inorganic solid electrolyte powder has an average particle size of 3 µm to 50 µm before wet grinding. In another embodiment, the inorganic solid electrolyte powder has an average particle size of 5 µm to 20 µm before wet grinding.

In an embodiment, the inorganic solid electrolyte powder in the preparatory slurry A has an average particle size of 90 nm to 500 nm after wet grinding. In another embodiment, the inorganic solid electrolyte powder in the preparatory slurry A has an average particle size of 100 nm to 400 nm after wet grinding. In another embodiment, the inorganic solid electrolyte powder in the preparatory slurry A has an average particle size of 150 nm to 300 nm after wet grinding. In another embodiment, the inorganic solid electrolyte powder in the preparatory slurry A has an average particle size of 200 nm to 250 nm after wet grinding.

In an embodiment, in the step of mixing an inorganic solid electrolyte powder with a first solvent and wet grinding an obtained mixture to form a preparatory slurry A, the inorganic solid electrolyte powder is 20% to 50% by mass of the preparatory slurry A. In another embodiment, in the step of mixing an inorganic solid electrolyte powder with a first solvent and wet grinding an obtained mixture to form a preparatory slurry A, the inorganic solid electrolyte powder is 25% to 45% by mass of the preparatory slurry A. In the present disclosure, if the content of the inorganic solid electrolyte powder in the preparatory slurry A is too small, the contact and friction between the inorganic solid electrolyte powder and the grinding medium, and between the inorganic solid electrolyte particles in the wet grinding process of the inorganic solid electrolyte powder will be restricted, and it is difficult to obtain the preparatory slurry A required by the present disclosure. If the content of the inorganic solid electrolyte powder in the preparatory slurry A is too high, the inorganic solid electrolyte powder is liable to meet, agglomerate or even clogging during the wet grinding process, which results the particle size of the inorganic solid electrolyte powder in the preparatory slurry A is too large, and further affects the technical effects of the present disclosure.

In an embodiment, in the step of mixing an inorganic solid electrolyte powder with a first solvent and wet grinding an obtained mixture to form a preparatory slurry A, the inorganic solid electrolyte is selected from a group consisting of perovskite-type solid electrolyte, garnet-type solid electrolyte, NASICON-type solid electrolyte, LISICON-type solid electrolyte, and amorphous composite solid electrolyte.

In an embodiment, the perovskite-type solid electrolyte is selected from $Li_{3a}La_{2/3-a}TiO_3$, wherein $0.05 \leq a \leq 0.3$.

In an embodiment, the garnet-type solid electrolyte is selected from $Li_{7-\delta}C_zLa_{3-y}B_yZr_{2-x}A_xO_{12}$, wherein A is selected from Ta, Nb, Sb, W, Y, V, Sc, Bi, Si, Ti, Te, Hf, Ge, Zn and Sn, B is selected from Mg, Ca, Sr, Ba, Ce, Pr, Nd, Sm, Pm and Eu, C is selected from Al, Ga, B, In and Tl, wherein $0 \leq x \leq 1$, $0 \leq y \leq 1$, $0 \leq z \leq 0.5$, $-1 \leq \delta \leq 2$.

In an embodiment, the NASICON-type solid electrolyte is selected from $Li_{1+b}Al_bM_{2-b}(PO_4)_3$, wherein M is selected from Ti and Ge, $0 < b \leq 0.6$.

In an embodiment, the LISICON-type solid electrolyte is selected from $Li_{14}Zn(GeO_4)_4$.

In an embodiment, the amorphous composite solid electrolyte is selected from $eLi_2O\text{-}(1-e)SiO_2$, wherein $0.2 \leq e \leq 0.8$.

In an embodiment, the solvent (i.e., the first solvent, the second solvent and the third solvent) is selected from a group consisting of N-methylpyrrolidone, deionized water, terpineol, anhydrous ethanol, isopropanol, toluene, N-methylformamide, N,N'-dimethylformamide, dimethylacetamide, tetrahydrofuran, methylene chloride, trichloromethane, tetrachloromethane, acetonitrile, and anhydrous hydrazine. In another embodiment, the solvent (i.e., the first solvent, the second solvent and the third solvent) is selected from a ground consisting of N-methylpyrrolidone, deionized water, terpineol, anhydrous ethanol, and toluene.

In an embodiment, the binder is selected from a group consisting of polyvinylidene fluoride, polytetrafluoroethylene, polyvinyl chloride, polyethylene oxide, styrene butadiene rubber, sodium carboxymethyl fiber, methyl cellulose, ethyl cellulose, hydroxypropyl cellulose, polyvinyl alcohol, polyvinyl butyral, polyacrylic acid, polyacrylonitrile, and polymethyl methacrylate. In another embodiment, the binder is selected from a group consisting of polyvinylidene fluoride, styrene butadiene rubber, sodium carboxymethyl cellulose, ethyl cellulose, and polyvinyl butyral.

In an embodiment, in the step of mixing a binder with a second solvent to form a preparatory slurry B, the binder is 2% to 20% by mass of the preparatory slurry B. In another embodiment, in the step of mixing a binder with a second solvent to form a preparatory slurry B, the binder is 5% to 15% by mass of the preparatory slurry B. In the present disclosure, if the content of the binder in the preparatory slurry B is too low, the coating of the inorganic solid electrolyte composite slurry coated on the positive electrode, the negative electrode, or the separator is insufficient in adhesion and easily to peel off. If the content of the binder in the preparatory slurry B is too high, an unnecessary loss in battery performance such as energy density will be generated.

In an embodiment, in the step of mixing the preparatory slurry A with the preparatory slurry B to obtain the inorganic solid electrolyte composite slurry, the inorganic solid electrolyte powder is 10% to 40% by mass of the inorganic electrolyte composite slurry. In another embodiment, in the step of mixing the preparatory slurry A with the preparatory slurry B to obtain the inorganic solid electrolyte composite slurry, the inorganic solid electrolyte powder is 15% to 35% by mass of the inorganic electrolyte composite slurry. In the present disclosure, if the content of the inorganic solid electrolyte powder in the inorganic solid electrolyte composite slurry is too low, the prepared inorganic solid electrolyte composite slurry has poor stability and poor coating performance. If the content of the inorganic solid electrolyte powder in the inorganic solid electrolyte composite slurry is too high, the fluidity of the composite slurry is insufficient, and the coating layer of the obtained inorganic solid electrolyte composite slurry will be thick.

In an embodiment, in the step of mixing the preparatory slurry A with the preparatory slurry B to obtain the inorganic solid electrolyte composite slurry, the binder is 0.5% to 5% by mass of the inorganic electrolyte composite slurry. In another embodiment, in the step of mixing the preparatory slurry A with the preparatory slurry B to obtain the inorganic solid electrolyte composite slurry, the binder is 1% to 3% by mass of the inorganic electrolyte composite slurry. In the present disclosure, if the content of the binder in the inorganic solid electrolyte composite slurry is too low, the obtained inorganic solid electrolyte composite slurry has poor adhesion. If the content of the binder in the inorganic solid electrolyte composite slurry is too high, the transmission of lithium-ions in the prepared battery will be restricted.

In an embodiment, the conductive agent is a carbon material.

In an embodiment, the carbon material is selected from a group consisting of activated carbon, conductive carbon black (Super-P), acetylene black, vapor grown carbon fibers, carbon nanotubes, graphenes, fullerenes, graphitized mesocarbon microbeads, and soft carbon, hard carbon, and graphite. In another embodiment, the carbon material is selected from at least one of conductive carbon black (Super-P), vapor grown carbon fiber, carbon nanotubes, and graphitized mesocarbon microbeads.

The present disclosure also provides an inorganic solid electrolyte composite slurry prepared by the abovementioned method.

The present disclosure further provides an application of an inorganic solid electrolyte composite slurry, which includes coating the inorganic solid electrolyte composite slurry on a surface of a lithium-ion battery functional layer. The lithium-ion battery functional layer is at least one selected from a group consisting of a positive electrode plate, a negative electrode plate, and a separator.

In an embodiment, the active material in the positive electrode plate is at least one selected from a group consisting of lithium cobaltate, lithium manganate, lithium iron phosphate, lithium manganese phosphate, lithium iron manganese phosphate, lithium vanadium phosphate, lithium nickelate, lithium nickel manganese oxide, lithium manganese silicate, lithium nickel-cobalt-manganate oxide and lithium nickel-cobalt-aluminate oxide.

In an embodiment, a current collector of the positive electrode plate is selected from aluminum foil.

In an embodiment, the active material in the negative electrode plate is at least one selected from a group consisting of graphite, hard carbon, soft carbon, graphene, graphitized mesocarbon microbeads, tin-based, silicon-based alloy material, tin oxide, tungsten oxide, molybdenum oxide, vanadium oxide, titanium oxide and lithium titanate.

In an embodiment, a current collector of the negative electrode plate is selected from copper foil or aluminum foil.

In an embodiment, the separator is selected from at least one of a polyolefin separator, a polyester separator, a cellulose separator, a polyimide separator, a polyamide separator, a spandex separator, and an aramid separator.

In an embodiment, a porosity of the separator is in a range from 30% to 80%.

In an embodiment, the coating method is selected from at least one of extrusion coating, gravure coating, screen printing, spray coating, and inkjet printing.

In an embodiment, the coating method is gravure coating and/or screen printing.

In an embodiment, the coating layer has a thickness of 2 µm to 5 µm.

In an embodiment, the coating layer has a thickness of 2 µm to 3 µm.

The invention provides a positive electrode of a lithium battery, which is formed by coating the positive electrode plate with the inorganic solid electrolyte composite slurry of the present disclosure.

The invention provides a negative electrode of a lithium battery, which is formed by coating the negative electrode plate with the inorganic solid electrolyte composite slurry of the present disclosure.

The invention provides a separator for a lithium battery, which is formed by coating the separator with the inorganic solid electrolyte composite slurry of the present disclosure.

The present disclosure provides a lithium battery including a negative electrode, an electrolyte, a separator, and the positive electrode of the present disclosure. In an embodiment, a lithium battery includes a positive electrode, an electrolyte, a separator, and the negative electrode of the present disclosure. In an embodiment, a lithium battery includes a positive electrode, a negative electrode, an electrolyte, and the separator of the present disclosure. In an embodiment, a lithium battery includes the positive electrode of the present disclosure, the negative electrode of the present disclosure, the separator of the present disclosure, and an electrolyte.

The present disclosure provides a lithium-ion battery, including at least one lithium-ion battery functional layer. A surface of the at least one lithium-ion battery functional layer is coated with the inorganic solid electrolyte composite slurry of the present disclosure. The at least one lithium-ion battery functional layer is selected from a group consisting of a positive electrode and a negative electrode and a separator.

In order to make the abovementioned purposes, characteristics and advantages be more apparent and understandable, detailed descriptions accompanying preferred embodiments are given below.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

Embodiment 1

Preparation of $Li_{1.4}Al_{0.4}Ti_{1.6}(PO_4)_3$ Composite Slurry:

Mixing 400 g of $Li_{1.4}Al_{0.4}Ti_{1.6}(PO_4)_3$ powder prepared by solid phase reaction with an initial average particle size of 8.1 μm with 500 g of N-methylpyrrolidone, utilizing zirconia beads as grinding medium and sand milling the obtained mixture in a rotation speed of 2500 rpm at a temperature of 30° C. for 3 hours to form a preparatory slurry A. The average particle size of $Li_{1.4}Al_{0.4}Ti_{1.6}(PO_4)_3$ powder in the preparatory slurry A is 170 nm. Then, mixing 20 g of polyvinylidene fluoride with 300 g of N-methylpyrrolidone to form a preparatory slurry B, and mixing the preparatory slurry A with the preparatory slurry B to obtain a $Li_{1.4}Al_{0.4}Ti_{1.6}(PO_4)_3$ composite slurry. The $Li_{1.4}Al_{0.4}Ti_{1.6}(PO_4)_3$ composite slurry includes 32.79% by mass of $Li_{1.4}Al_{0.4}Ti_{1.6}(PO_4)_3$, 1.64% by mass of polyvinylidene fluoride and 65.57% by mass of N-methylpyrrolidone.

An Application of $Li_{1.4}Al_{0.4}Ti_{1.6}(PO_4)_3$ Composite Slurry:

Applying the $Li_{1.4}Al_{0.4}Ti_{1.6}(PO_4)_3$ composite slurry on both surfaces of a nickel-cobalt-manganese positive electrode plate by gravure coating technique, and drying the electrode plate in an oven at 90° C. for 2 hours to fully remove the N-methylpyrrolidone and the moisture. Before coating, the positive active material in the nickel-cobalt-manganese positive electrode plate is lithium nickel-cobalt-manganate oxide, the conductive agent is vapor grown carbon fiber, the binder is polyvinylidene fluoride, the mass percentages of the positive active material, the conductive agent and the binder are 92%, 4% and 4%, and the current collector is aluminum foil. The thickness of the $Li_{1.4}Al_{0.4}Ti_{1.6}(PO_4)_3$ composite coating applied on the surface of the nickel-cobalt-manganese positive electrode plate is 3 μm.

Battery Production:

Assembling the positive electrode plate of this embodiment together with a negative electrode plate, a separator, an electrolyte to form a pouch lithium-ion battery having a design capacity of 10 Ah. In this embodiment, the negative active material in the negative electrode plate is graphite, the conductive agent is conductive carbon black (Super-P), the binder is polyvinylidene fluoride, the mass percentages of the negative active material, the conductive agent and the binder are 93%, 3% and 4%, and the current collector is copper foil. Furthermore, in this embodiment, the separator is a polyethylene stretched separator, the electrolyte is a non-aqueous electrolyte including $LiPF_6$ as a lithium salt, and 30 wt % of ethylene carbonate combined with 70 wt % of ethyl methyl carbonate as a composite solvent with a concentration of $LiPF_6$ being 1 mol·$L^{-1}$.

Battery Performance Test:

1. Capacity Retention

Figure 1:
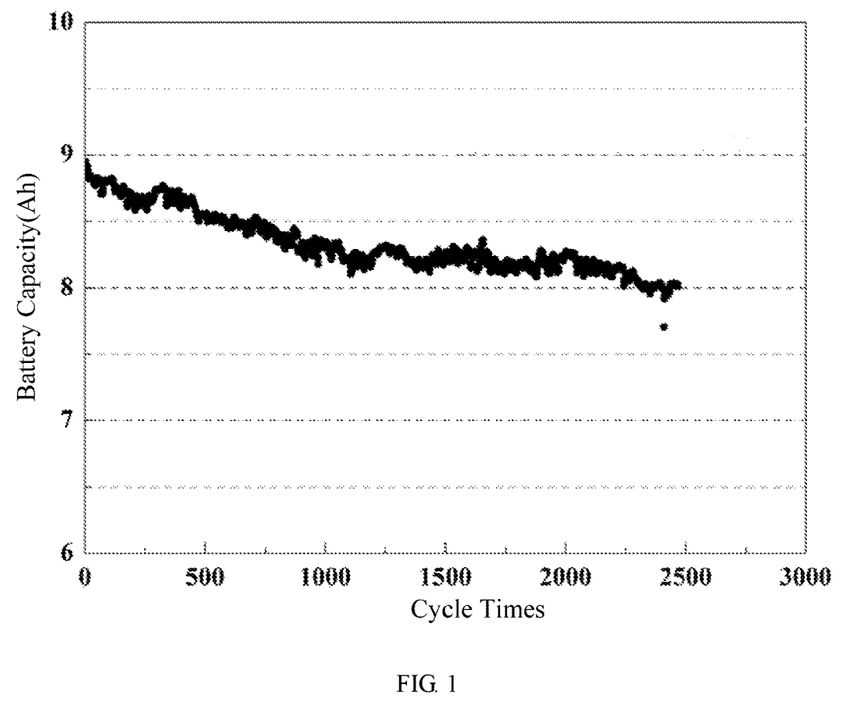
FIG. 1 shows a cyclic performance curve of a pouch lithium-ion battery of embodiment 1 of the present disclosure.

At room temperature (25° C.), the cycle performance test (the cut-off voltage of charge-discharge operation is 2.5V to 4.1V) at 3 C charge and 6 C discharge rate shows that after 2500 cycles, the battery capacity retention remains at 80% (see FIG. 1).

2. Safety Performance Test

Figure 2:
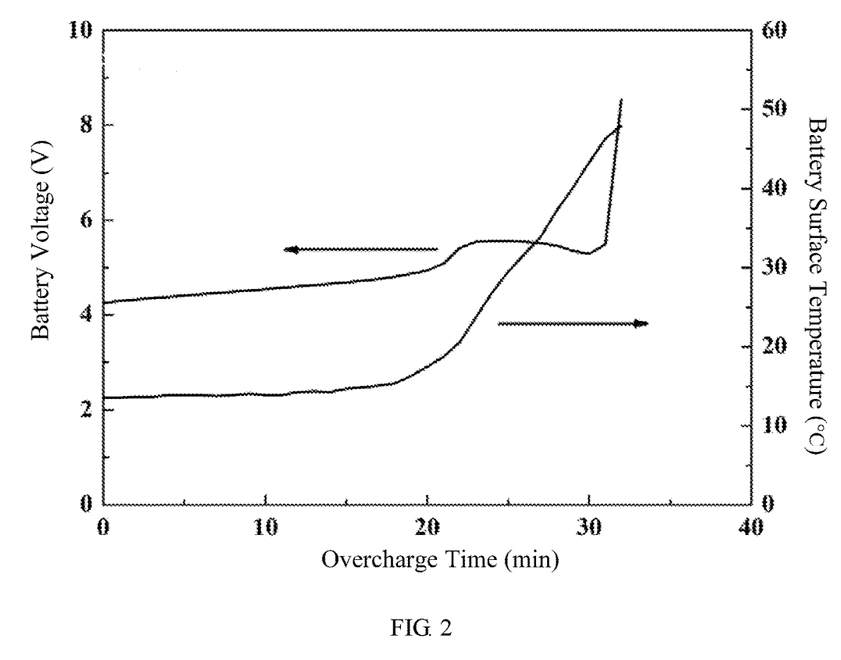
FIG. 2 shows a battery voltage-battery surface temperature-overcharge time curve of a pouch lithium-ion battery of embodiment 1 of the present disclosure.

The battery is fully charged at 4.2V and continues to perform 1 C overcharge, when the voltage of the battery is doubled and rises to 8.4V, the surface temperature of the battery is only 50° C. It can be seen that the battery only occurs slight bulging, but will not cause broken, fire and other safety accidents (see FIG. 2).

Embodiment 2

Preparation of $Li_{6.5}La_3Zr_{1.5}Ta_{0.5}O_{12}$ Composite Slurry:

Mixing 300 g of $Li_{6.5}La_3Zr_{1.5}Ta_{0.5}O_{12}$ powder prepared by solid phase reaction with an initial average particle size of 9.2 μm with 400 g of terpineol, utilizing zirconia beads as grinding medium, and sand milling the obtained mixture in a rotation speed of 2800 rpm at a temperature of 35° C. for 5 hours to form a preparatory slurry A. The average particle size of $Li_{6.5}La_3Zr_{1.5}Ta_{0.5}O_{12}$ powder in the preparatory slurry A is 160 nm. Then, mixing 15 g of ethyl cellulose with 200 g of terpineol to form a preparatory slurry B, and mixing the preparatory slurry A and the preparatory slurry B with 35 g of terpineol to obtain a $Li_{6.5}La_3Zr_{1.5}Ta_{0.5}O_{12}$ composite slurry. The $Li_{6.5}La_3Zr_{1.5}Ta_{0.5}O_{12}$ composite slurry includes 31.58% by mass of $Li_{6.5}La_3Zr_{1.5}Ta_{0.5}O_{12}$, 1.58% by mass of ethyl cellulose, and 66.84% by mass of terpineol.

An Application of $Li_{6.5}La_3Zr_{1.5}Ta_{0.5}O_{12}$ Composite Slurry:

Coating the $Li_{6.5}La_3Zr_{1.5}Ta_{0.5}O_{12}$ composite slurry on both surfaces of a graphite negative electrode plate by screen printing technique, and drying the electrode plate in an oven at 90° C. for 2 hours to fully remove the terpineol and the moisture. The negative active material in the graphite negative electrode plate before coating is graphite, the conductive agent is conductive carbon black (Super-P), the binder is polyvinylidene fluoride, the mass percentages of the negative active material, the conductive agent and binder are respectively 93%, 3% and 4%, and the current collector is copper foil. The thickness of the $Li_{6.5}La_3Zr_{1.5}Ta_{0.5}O_{12}$ composite coating applied on the surface of the graphite negative electrode plate is 1.5 μm.

Battery Production:

Assembling the negative electrode plate of this embodiment together with a positive electrode plate, a separator, an electrolyte to form a pouch lithium-ion battery with a design capacity of 10 Ah. In this embodiment, the positive active material in the positive electrode plate is lithium nickel-cobalt-manganate oxide, the conductive agent is vapor grown carbon fiber, the binder is polyvinylidene fluoride, the mass percentages of the positive active material, the conductive agent and the binder are 92%, 4% and 4%, and the current collector is aluminum foil. Furthermore, in this embodiment, the separator is a polyethylene stretched separator, the electrolyte is a non-aqueous electrolyte including $LiPF_6$ as a lithium salt, and 30 wt % of ethylene carbonate combined with 70 wt % of ethyl methyl carbonate as a composite solvent with a concentration of $LiPF_6$ being 1 mol·$L^{-1}$.

Battery Performance Test:
1. Capacity Retention

Figure 3:
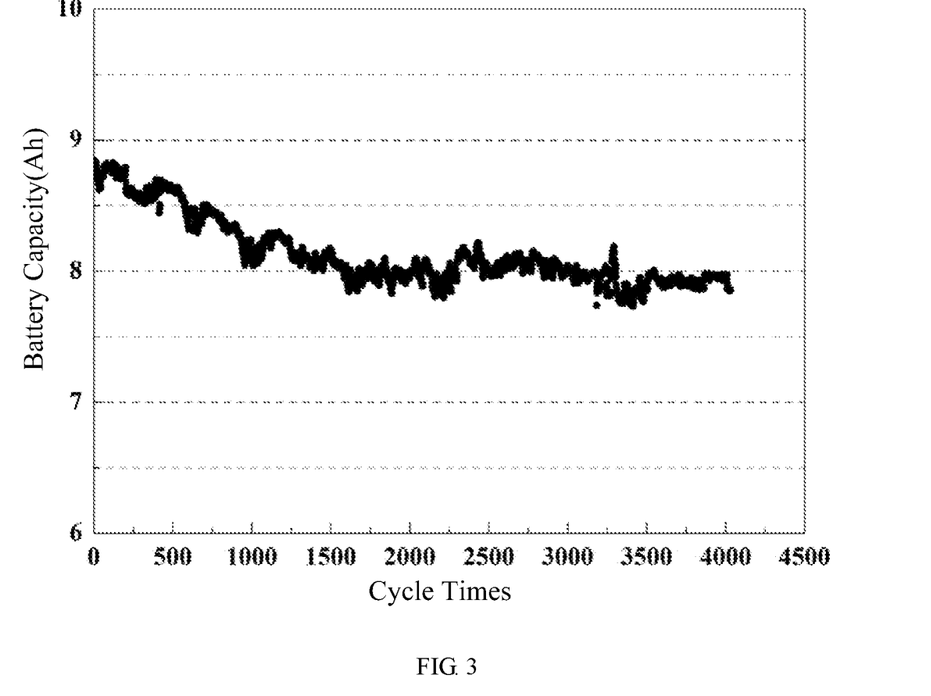
FIG. 3 shows a cyclic performance curve of a pouch lithium-ion battery of embodiment 2 of the present disclosure.

At room temperature (25° C.), the cycle performance test (the cut-off voltage of charge-discharge operation is 2.5V to 4.1V) at 3 C charge and 6 C discharge rate shows that after 4000 cycles, the battery capacity retention rate remains at 89% (see FIG. 3).

2. Safety Performance Test

Figure 4:
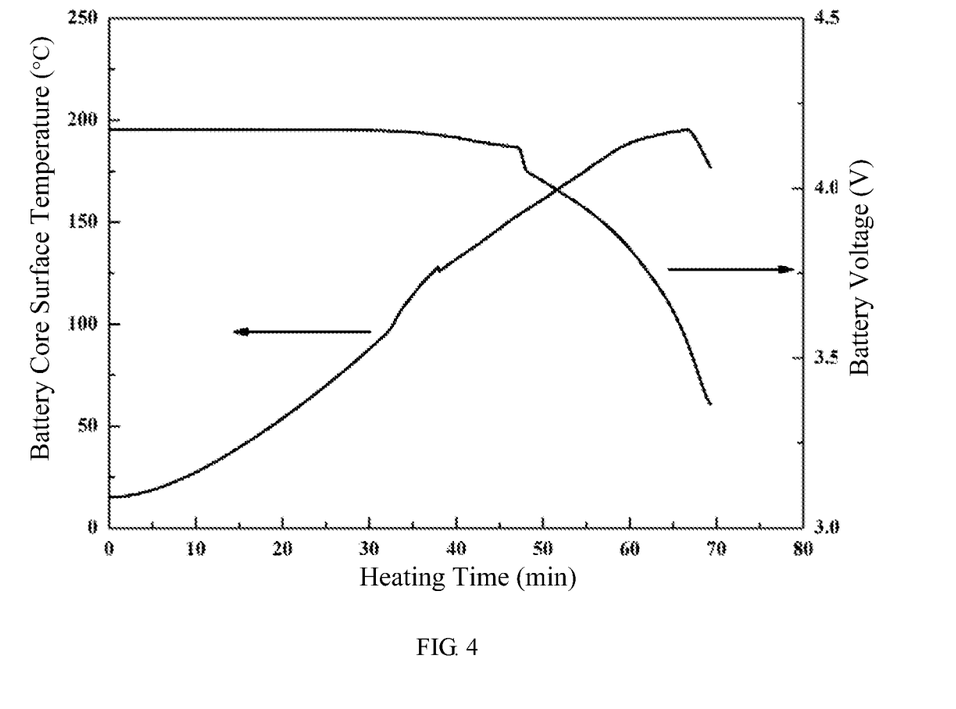
FIG. 4 shows a battery surface temperature-battery voltage-heating time curve of a pouch lithium-ion battery of embodiment 2 of the present disclosure.

Under the state of full charged of 4.2V, a heating test made in a condition that the battery being put in a hot box and then heated to a temperature of 200° C. for 30 minutes shows that after being kept in 200° C. for 30 minutes, the surface temperature of the battery cell rises to 200° C., but the battery cell does not catch fire in this process and still has an output voltage of 3.3V (See FIG. 4).

Embodiment 3

Preparation of $Li_{1.5}Al_{0.5}Ge_{1.5}(PO_4)_3$ Composite Slurry:

Mixing 500 g of $Li_{1.5}Al_{0.5}Ge_{1.5}(PO_4)_3$ powder prepared by solid phase reaction with an initial average particle size of 7.1 μm with 600 g of deionized water, utilizing stainless steel beads as grinding medium, and sand milling the obtained mixture in a rotation speed of 2000 rpm at a temperature of 25° C. for 2 hours to form a preparatory slurry A. The average particle size of $Li_{1.5}Al_{0.5}Ge_{1.5}(PO_4)_3$ powder in the preparatory slurry A is 180 nm. Then, mixing 7.5 g of sodium carboxymethyl cellulose with 100 g of deionized water and adding 10 g of styrene-butadiene rubber to form a preparatory slurry B, and mixing the preparatory slurry A and the preparatory slurry B with 82.5 g of deionized water and stirring the obtained mixture for 3 hours to obtain a $Li_{1.5}Al_{0.5}Ge_{1.5}(PO_4)_3$ composite slurry. The $Li_{1.5}Al_{0.5}Ge_{1.5}(PO_4)_3$ composite slurry includes 38.46% by mass of $Li_{1.5}Al_{0.5}Ge_{1.5}(PO_4)_3$, 0.58% by mass of sodium carboxymethyl cellulose, 0.77% by mass of styrene butadiene rubber and 60.19% by mass of deionized water.

An application of $Li_{1.5}Al_{0.5}Ge_{1.5}(PO_4)_3$ Composite Slurry:

Coating the $Li_{1.5}Al_{0.5}Ge_{1.5}(PO_4)_3$ composite slurry on both surfaces of a porous polyethylene stretched separator by gravure coating technique, and baking the separator in an oven at 80° C. for 2 hours to fully dry it. The thickness of the $Li_{1.5}Al_{0.5}Ge_{1.5}(PO_4)_3$ composite coating applied on the surface of the polyethylene stretched separator is 2.0 μm.

Battery Production:

Assembling the separator of this embodiment together with a positive electrode plate, a negative electrode plate and an electrolyte to form a pouch lithium-ion battery having a designed capacity of 10 Ah. In this embodiment, the positive active material in the positive electrode plate is lithium nickel-cobalt-manganate oxide, the conductive agent is vapor grown carbon fiber, the binder is polyvinylidene fluoride, the mass percentages of the positive active material, the conductive agent and the binder are 92%, 4% and 4%, and the current collector is aluminum foil. Furthermore, in this embodiment, the negative active material in the negative electrode plate is graphite, the conductive agent is conductive carbon black (Super-P), the binder is polyvinylidene fluoride, the mass percentages of the negative active material, the conductive agent and the binder is 93%:3%:4%, and the current collector is copper foil. In addition, the electrolyte is a non-aqueous electrolyte solution including $LiPF_6$ as a lithium salt, and 30 wt % of ethylene carbonate combined with 70 wt % ethyl methyl carbonate as a composite solvent with a concentration of $LiPF_6$ being 1 mol·$L^{-1}$.

Battery Performance Test:
1. Capacity Retention

Figure 5:
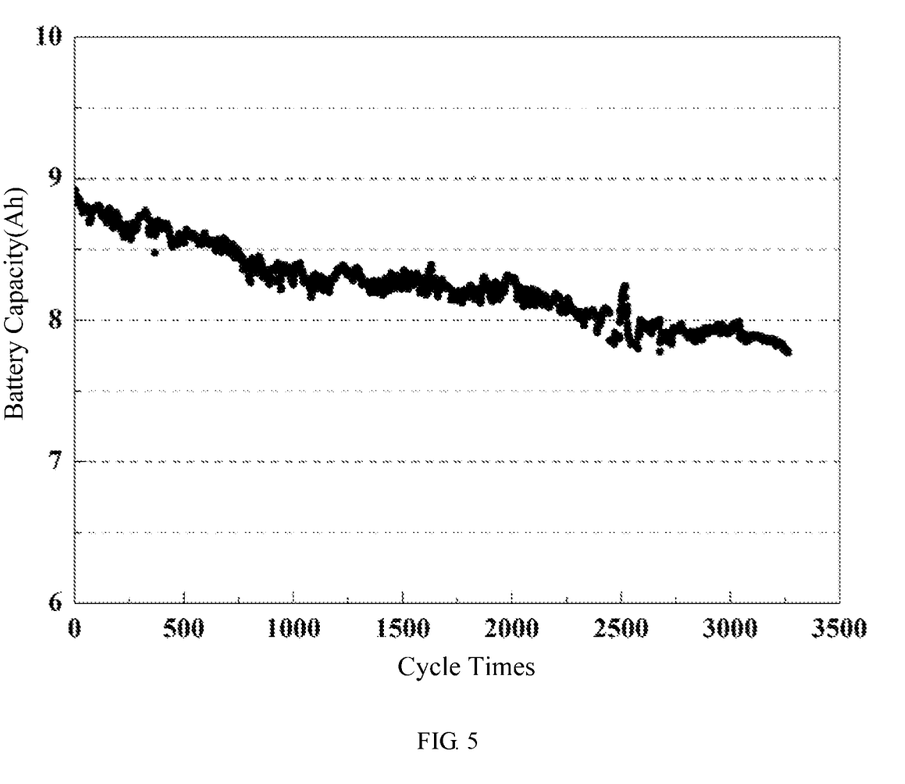
FIG. 5 shows a cyclic performance curve of a pouch lithium-ion battery of embodiment 3 of the present disclosure.

At room temperature (25° C.), the cycle performance test (the cut-off voltage of charge-discharge operation is 2.5V to 4.1V) at 3 C charge and 6 C discharge rate shows that after 3200 cycles, the battery capacity retention remains at 87% (see FIG. 5).

2. Safety Performance Test

Under the state of full charged of 4.2V, doing penetration test at a speed of 25 mm/s by a steel needle with a diameter of 5 mm and checking the state of the battery during this process. The test result shows that the penetration positions of the battery only generate a small amount of smoke during the entire process, but not cause other undesirable phenomena such as swelling, cracking or catch fire.

Embodiment 4

Mixing 200 g of $Li_{0.35}La_{0.55}TiO_3$ powder prepared by solid phase reaction with an initial average particle size of 18.5 μm with 300 g of N-methylpyrrolidone, utilizing zirconium silicate beads as grinding medium, and wet ball milling the mixture in a rotation speed of 600 rpm at a temperature of 20° C. for 24 hours to form a preparatory slurry A. The average particle size of $Li_{0.35}La_{0.55}TiO_3$ powder in the preparatory slurry A is 480 nm. Then, mixing 8 g of polyvinylidene fluoride with 120 g of N-methylpyrrolidone to form a preparatory slurry B, and mixing the preparatory slurry A and the preparatory slurry B with 5 g of vapor grown carbon fiber and 30 g of N-methylpyrrolidone to obtain a $Li_{0.35}La_{0.55}TiO_3$ composite slurry. The $Li_{0.35}La_{0.55}TiO_3$ composite slurry includes 30.17% by mass of $Li_{0.35}La_{0.55}TiO_3$, 1.21% by mass of polyvinylidene fluoride, 0.75% by mass of vapor grown carbon fiber, and 67.87% by mass of N-methylpyrrolidone.

Embodiment 5

Mixing 100 g of $Li_{1.5}Al_{0.5}Ge_{1.5}(PO_4)_3$ powder prepared by the solid phase reaction with an initial average particle size of 10.2 μm with 400 g of N-methylpyrrolidone, utilizing stainless steel beads as grinding medium and wet ball milling the obtained mixture in a rotation speed of 250 rpm at a temperature of 25° C. for 6 hours to form a preparatory slurry A. The average particle size of $Li_{1.5}Al_{0.5}Ge_{1.5}(PO_4)_3$ powder in the preparatory slurry A is 490 nm. Then, mixing 8 g of polyvinylidene fluoride with 160 g of N-Methyl pyrrolidone to form a preparatory slurry B, and mixing the preparatory slurry A and the preparatory slurry B with 4 g of carbon nanotubes to obtain a $Li_{1.5}Al_{0.5}Ge_{1.5}(PO_4)_3$ composite slurry, in which the mass percentages of $Li_{1.5}Al_{0.5}Ge_{1.5}(PO_4)_3$, the polyvinylidene fluoride, the carbon nanotubes and the N-methylpyrrolidone are respectively 14.88%, 1.19%, 0.60% and 83.33%.

Embodiment 6

Mixing 500 g of $Li_{1.4}Al_{0.4}Ge_{1.6}(PO_4)_3$ powder prepared by a solid phase reaction with an initial average particle size of 46.8 μm with 700 g of terpineol, utilizing zirconia beads as grinding medium, and wet ball milling the mixture in a rotation speed of 1000 rpm at a temperature of 35° C. for 48 hours and then sand milling the mixture in a rotation speed of 3000 rpm at a temperature of 35° C. for 3 hours to form a preparatory slurry A. The average particle size of $Li_{1.4}Al_{0.4}Ge_{1.6}(PO_4)_3$ powder in the preparatory slurry A is 150 nm. Then, mixing 30 g of ethyl cellulose with 300 g of terpineol to form a preparatory slurry B, and mixing the preparatory slurry A and the preparatory slurry B with 15 g of conductive carbon black (Super-P) and 50 g of terpineol to obtain a $Li_{1.4}Al_{0.4}Ge_{1.6}(PO_4)_3$ composite slurry, in which the mass percentages of $Li_{1.4}Al_{0.4}Ge_{1.6}(PO_4)_3$, the ethyl cellulose, the conductive carbon black (Super-P) and the terpineol are respectively 31.35%, 1.88%, 0.94% and 65.83%.

Embodiment 7

Mixing 200 g of $Li_{6.25}Ga_{0.25}La_3Zr_2O_{12}$ powder prepared by solid phase reaction with an initial average particle size of 4.5 μm with 200 g of deionized water, utilizing zirconia beads as grinding medium, and sand milling the mixture in a rotation speed of 3500 rpm at a temperature of 40° C. for 10 hours to form a preparatory slurry A. The average particle size of $Li_{6.25}Ga_{0.25}La_3Zr_2O_{12}$ powder in the preparatory slurry A is 90 nm. Then, mixing 8 g of sodium carboxymethylcellulose with 80 g of deionized water and adding 12 g of styrene-butadiene rubber to form a preparatory slurry B, and mixing the preparatory slurry A with the preparatory slurry B to obtain a $Li_{6.25}Ga_{0.25}La_3Zr_2O_{12}$ composite slurry, wherein the mass percentages of $Li_{6.25}Ga_{0.25}La_3Zr_2O_{12}$, the sodium carboxymethylcellulose, the styrene-butadiene rubber and the deionized water are respectively 40.00%, 1.60%, 2.40% and 56.00%.

Embodiment 8

Mixing 400 g of $Li_{14}Zn(GeO_4)_4$ powder prepared by solid phase reaction with an initial average particle size of 15.8 μm with 250 g of toluene and 300 g of anhydrous ethanol, utilizing zirconia beads as grinding medium, and sand milling the mixture in a rotation speed of 2800 rpm at a temperature of 35° C. for 1 hour to form a preparatory slurry A. The average particle size of $Li_{14}Zn(GeO_4)_4$ powder in the preparatory slurry A is 260 nm. Then, mixing 30 g of polyvinyl butyral with 60 g of toluene and 60 g of anhydrous ethanol to form a preparatory slurry B, and mixing the preparatory slurry A and the preparatory slurry B with 50 g of anhydrous ethanol to obtain a $Li_{14}Zn(GeO_4)_4$ composite slurry in which the mass percentages of $Li_{14}Zn(GeO_4)_4$, the polyvinyl butyral, the toluene and the anhydrous ethanol are respectively 34.78%, 2.61%, 26.96% and 35.65%.

Embodiment 9

Mixing 200 g of $Li_{0.35}La_{0.55}TiO_3$ powder prepared by solid-phase reaction with an initial average particle size of 10.7 μm with 300 g of terpineol, utilizing stainless steel beads as grinding medium and wet ball milling the mixture in a rotation speed of 100 rpm at a temperature of 30° C. for 24 hours to form a preparatory slurry A. The average particle size of $Li_{0.35}La_{0.55}TiO_3$ powder in the preparatory slurry A is 420 nm. Then, mixing 15 g of ethyl cellulose with 200 g of terpineol to form a preparatory slurry B, and mixing the preparatory slurry A and the preparatory slurry B with 10 g of carbon nanotubes and 50 g of terpineol to obtain a $Li_{0.35}La_{0.55}TiO_3$ composite slurry, in which the mass percentages of $Li_{0.35}La_{0.55}TiO_3$, the ethyl cellulose, the carbon nanotubes and the terpineol are respectively 25.81%, 1.94%, 1.29% and 70.96%.

Embodiment 10

Mixing 400 g of $0.6Li_2O-0.4SiO_2$ powder prepared by solid phase reaction with an initial average particle size of 8.9 μm with 500 g of deionized water, utilizing zirconium silicate beads as grinding medium and sand milling the mixture in a rotation speed of 1500 rpm at a temperature of 50° C. for 24 hours to form a preparatory slurry A. The average particle size of $0.6Li_2O-0.4SiO_2$ powder in the preparatory slurry A is 240 nm. Then, mixing 10 g of sodium carboxymethyl cellulose with 120 g of deionized water, and adding 12 g of styrene-butadiene rubber to form a preparatory slurry B, and mixing the preparatory slurry A and preparatory slurry B with 10 g of vapor grown carbon fiber and 48 g of deionized water to obtain a $0.6Li_2O-0.4SiO_2$ composite slurry, wherein the mass percentages of $0.6Li_2O-0.4SiO_2$, the sodium carboxymethyl cellulose, the styrene-butadiene rubber, the vapor grown carbon fibers and the deionized water are respectively 36.36%, 0.91%, 1.09%, 0.91% and 60.73%.

Comparative Embodiment 1

Mixing 400 g of $Li_{1.4}Al_{0.4}Ti_{1.6}(PO_4)_3$ powder prepared by solid phase reaction with an initial average particle size of 8.1 μm with 20 g of polyvinylidene fluoride and 800 g of N-methylpyrrolidone, utilizing zirconia beads as grinding medium and sand milling the mixture in a rotation in a speed of 2500 rpm at a temperature of 30° C. for 5 hours to prepare a $Li_{1.4}Al_{0.4}Ti_{1.6}(PO_4)_3$ composite slurry, in which the mass percentages of $Li_{1.4}Al_{0.4}Ti_{1.6}(PO_4)_3$, the polyvinylidene fluoride and the N-methylpyrrolidone are respectively 32.79%, 1.64% and 65.57%. The average particle size of $Li_{1.4}Al_{0.4}Ti_{1.6}(PO_4)_3$ powder in the composite slurry is still greater than 1.5 μm.

An Application of $Li_{1.4}Al_{0.4}Ti_{1.6}(PO_4)_3$ Composite Slurry:

Coating the $Li_{1.4}Al_{0.4}Ti_{1.6}(PO_4)_3$ composite slurry of this comparative embodiment on both surfaces of a nickel-cobalt-manganese positive electrode plate by gravure coating technique, and drying the positive electrode plate in an oven at 90° C. for 2 hours to fully remove the N-methylpyrrolidone and the moisture. The positive active material in the positive electrode plate before coating is lithium nickel-cobalt-manganate oxide, the conductive agent is vapor grown carbon fiber, the binder is polyvinylidene fluoride, the mass percentages of the positive active material, the conductive agent and the binder are respectively 92%, 4% and 4%, and the current collector is aluminum foil. The thickness of the $Li_{1.4}Al_{0.4}Ti_{1.6}(PO_4)_3$ composite coating applied on the surface of the nickel-cobalt-manganese positive electrode plate is in a range from 1.5 μm to 2.0 μm. In the present comparative embodiment, the particle size of the $Li_{1.4}Al_{0.4}Ti_{1.6}(PO_4)_3$ powder is relative large, and the compactness of the composite coating is poor, thereby failing to effectively cover the active material on the nickel-cobalt-manganese positive electrode plate. Furthermore, the thickness of the composite coating is also thick (up to 7.0 μm to 10.0 μm), and the bond strength with the nickel-cobalt-manganese positive electrode plate is also poor (the powder is easy to desquamate).

Comparative Embodiment 2

Mixing 300 g of $Li_{6.5}La_3Zr_{1.5}Ta_{0.5}O_{12}$ powder prepared by solid-phase reaction with an initial average particle size of 9.2 μm well with 15 g of ethyl cellulose and 635 g of terpineol, utilizing zirconia beads as grinding medium and sand milling the obtained mixture in a rotation speed of 2800 rpm at a temperature of 35° C. for 5 hours to obtain a $Li_{6.5}La_3Zr_{1.5}Ta_{0.5}O_{12}$ composite slurry in which the mass percentages of $Li_{6.5}La_3Zr_{1.5}Ta_{0.5}O_{12}$, the ethyl cellulose and the terpineol are respectively 31.58%, 1.58% and 66.84%. The average particle size of the composite slurry $Li_{6.5}La_3Zr_{1.5}Ta_{0.5}O_{12}$ powder obtained in this embodiment is still greater than 2.0 μm, and the screen printing coating effect on the graphite negative electrode plate is not ideal, furthermore, the compactness is poor, the thickness is large, and the adhesiveness of the powder is not ideal.

Comparative Embodiment 3

Mixing 500 g of $Li_{1.5}Al_{0.5}Ge_{1.5}(PO_4)_3$ powder prepared by solid phase reaction with an initial average particle size of 7.1 μm well with 7.5 g of sodium carboxymethylcellulose, 782.5 g of deionized water and 10 g of styrene-butadiene rubber, utilizing stainless steel beads as grinding medium and sand milling the obtained mixture in a rotation speed of 2000 rpm at a temperature of 25° C. for 3 hours to prepare a $Li_{1.5}Al_{0.5}Ge_{1.5}(PO_4)_3$ composite slurry, wherein the mass percentages of $Li_{1.5}Al_{0.5}Ge_{1.5}(PO_4)_3$, the sodium carboxymethylcellulose, the styrene butadiene rubber and the deionized water are respectively 38.46%, 0.58%, 0.77% and 60.19%. The average particle size of the $Li_{1.5}Al_{0.5}Ge_{1.5}(PO_4)_3$ powder in the composite slurry of this comparative embodiment is still greater than 1.5 μm, and the gravure coating effect on the surface of the polyethylene stretched separator is not ideal, furthermore, the compactness is poor, the thickness is large, and the adhesiveness of the powder is not ideal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing an inorganic solid electrolyte composite slurry, comprising the following steps:
    mixing an inorganic solid electrolyte powder with a first solvent and wet grinding an obtained mixture to form a preparatory slurry A;
    mixing a binder with a second solvent to form a preparatory slurry B;
    mixing the preparatory slurry A with the preparatory slurry B to obtain the inorganic solid electrolyte composite slurry;
    wherein the inorganic solid electrolyte powder has an average particle size of 3 μm to 50 μm before wet grinding;
    the inorganic solid electrolyte powder in the preparatory slurry A has an average particle size of 90 nm to 500 nm after wet grinding.

2. The method according to claim 1, wherein the step of mixing the preparatory slurry A with the preparatory slurry B to obtain the inorganic solid electrolyte composite slurry comprises: mixing the preparatory slurry A and the preparatory slurry B with a third solvent to obtain the inorganic solid electrolyte composite slurry.

3. The method according to claim 1, wherein the step of mixing the preparatory slurry A with the preparatory slurry B to obtain the inorganic solid electrolyte composite slurry comprises: mixing the preparatory slurry A and the preparatory slurry B with a conductive agent to obtain an inorganic solid electrolyte composite slurry.

4. The method according to claim 1, wherein in the step of mixing an inorganic solid electrolyte powder with a first solvent and wet grinding an obtained mixture to form a preparatory slurry A, the temperature during wet grinding process is in a range from 20° C. to 50° C.

5. The method according to claim 1, wherein in the step of mixing an inorganic solid electrolyte powder with a first solvent and wet grinding an obtained mixture to form a preparatory slurry A, the wet grinding is sand milling, the sand milling time is in a range from 1 hour to 24 hours.

6. The method according to claim 1, wherein in the step of mixing an inorganic solid electrolyte powder with a first solvent and wet grinding an obtained mixture to form a preparatory slurry A, the wet grinding is wet ball milling, the wet ball milling time is in a range from 6 to 48 hours.

7. The method according to claim 1, wherein the inorganic solid electrolyte powder in the preparatory slurry A has an average particle size of 150 nm to 300 nm after wet grinding.

8. The method according to claim 1, wherein in the step of mixing an inorganic solid electrolyte powder with a first solvent and wet grinding an obtained mixture to form a preparatory slurry A, the inorganic solid electrolyte powder is 20% to 50% by mass of the preparatory slurry A.

9. The method according to claim 1, wherein in the step of mixing an inorganic solid electrolyte powder with a first solvent and wet grinding an obtained mixture to form a preparatory slurry A, the inorganic solid electrolyte is selected from a group consisting of perovskite-type solid electrolyte, garnet-type solid electrolyte, NASICON-type solid electrolyte, LISICON- type solid electrolyte and amorphous composite solid electrolyte.

10. The method according to claim 1, wherein the first solvent and the second solvent is, respectively, selected from a group consisting of N-methylpyrrolidone, deionized water, terpineol, anhydrous ethanol, isopropanol, toluene, N-methylformamide, N,N'-dimethylformamide, dimethylacetamide, tetrahydrofuran, methylene chloride, trichloromethane, tetrachloromethane, acetonitrile, and anhydrous hydrazine.

11. The method according to claim 1, wherein the binder is selected from a group consisting of polyvinylidene fluoride, polytetrafluoroethylene, polyvinyl chloride, polyethylene oxide, styrene butadiene rubber, sodium carboxymethyl fiber, methyl cellulose, ethyl cellulose, hydroxypropyl cellulose, polyvinyl alcohol, polyvinyl butyral, polyacrylic acid, polyacrylonitrile, and polymethyl methacrylate.

12. The method according to claim 1, wherein in the step of mixing a binder with a second solvent to form a preparatory slurry B, the binder is 2% to 20% by mass of the prepared slurry B.

13. The method according to claim 1, wherein in the step of mixing the preparatory slurry A with the preparatory slurry B to obtain the inorganic solid electrolyte composite slurry, the inorganic solid electrolyte powder is 10% to 40% by mass of the inorganic electrolyte composite slurry.

14. The method according to claim 1, wherein in the step of mixing the preparatory slurry A with the preparatory slurry B to obtain the inorganic solid electrolyte composite slurry, the binder is 0.5% to 5% by mass of the inorganic electrolyte composite slurry.

15. The method according to claim 3, wherein the conductive agent is a carbon material.

16. An inorganic solid electrolyte composite slurry, wherein the inorganic solid electrolyte composite slurry is prepared by the method according to claim 1.

17. An application of an inorganic solid electrolyte composite slurry, comprising:
    coating the inorganic solid electrolyte composite slurry prepared by the method of claim 1 onto a surface of a lithium-ion battery functional layer, wherein the lithium-ion battery functional layer is selected from a group consisting of a positive electrode plate, a negative electrode plate and a separator.

18. The application according to claim 17, wherein the coating method is selected from at least one of extrusion coating, gravure coating, screen printing, spray coating, and inkjet printing.

19. The application according to claim 17, wherein the thickness of the coating layer is in a range from 2 μm to 5 μm.

20. A lithium-ion battery, comprising:
    at least one lithium-ion battery functional layer, wherein the surface of the at least one lithium-ion battery functional layer is coated with the inorganic solid electrolyte composite slurry prepared by the method of claim 1, and the at least one lithium-ion battery functional layer is selected from at least one of a positive electrode plate, a negative electrode plate, and a separator.

* * * * *